Figure 1:
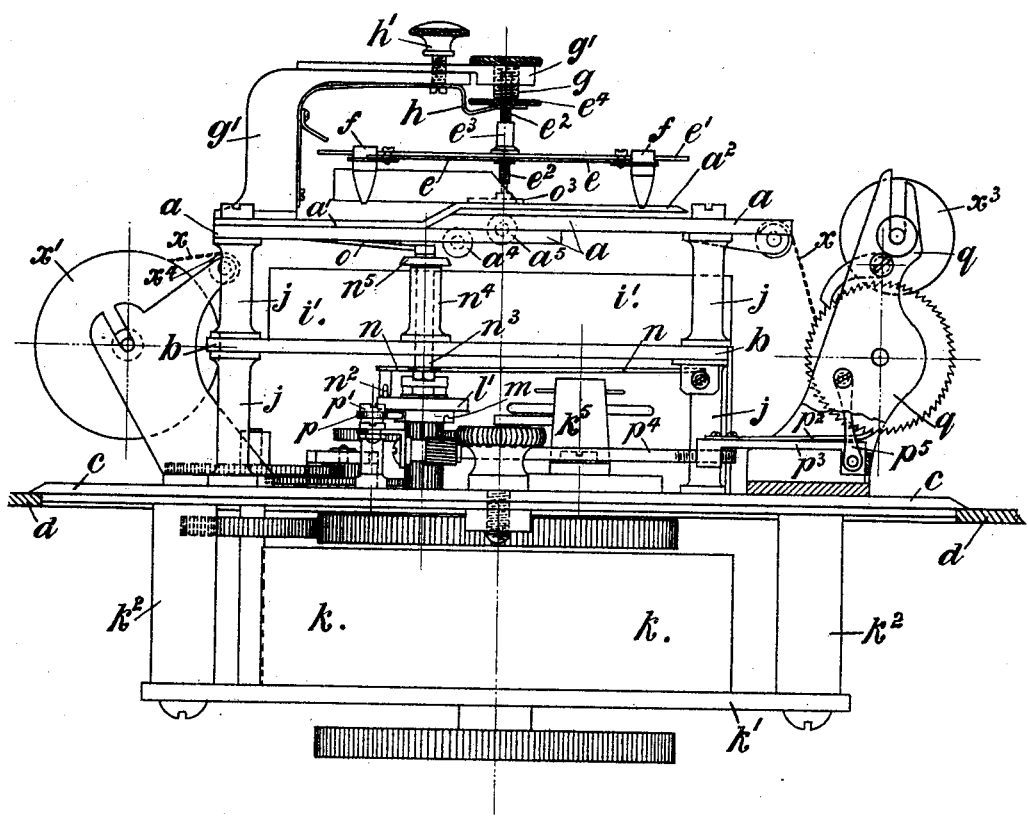

No. 670,861. Patented Mar. 26, 1901.
J. HOPE.
SHIP'S COURSE RECORDER.
(Application filed Apr. 25, 1900.)
(No Model.) 6 Sheets—Sheet 1.

WITNESSES:

INVENTOR
John Hope
BY
Richardson
ATTORNEYS

No. 670,861. Patented Mar. 26, 1901.
J. HOPE.
SHIP'S COURSE RECORDER.
(Application filed Apr. 25, 1900.)
(No Model.) 6 Sheets—Sheet 2.
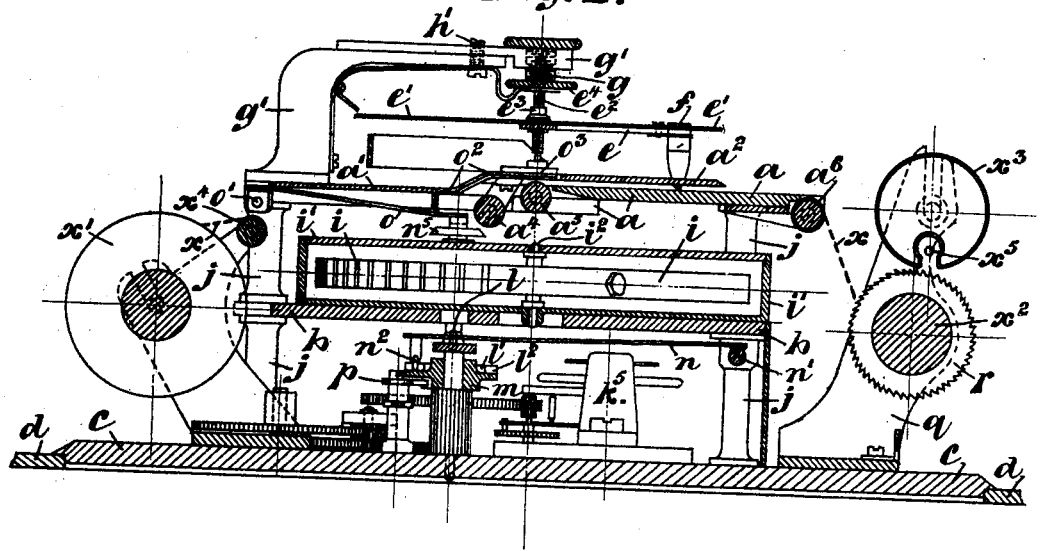
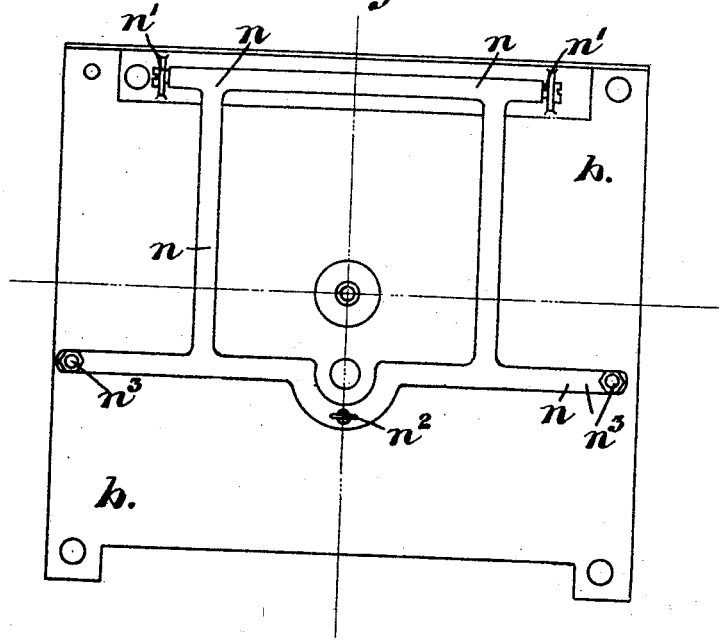
WITNESSES:
Ella L. Giles
Otto Munk
INVENTOR
John Hope
By Richardson
ATTORNEYS No. 670,861.  
J. HOPE.  
SHIP'S COURSE RECORDER.  
(Application filed Apr. 25, 1900.)  
Patented Mar. 26, 1901.

(No Model.)  
6 Sheets—Sheet 3.

WITNESSES:  
Ella L. Giles

INVENTOR  
John Hope  
BY  
Richard  
ATTORNEYS

THE NORRIS PETERS CO., PHOTO-LITHO., WASHINGTON, D. C.

No. 670,861. Patented Mar. 26, 1901.
J. HOPE.
SHIP'S COURSE RECORDER.
(Application filed Apr. 25, 1900.)
(No Model.) 6 Sheets—Sheet 5.

WITNESSES:
Ella L. Giles
Otto ———

INVENTOR
John Hope
BY
Richards ——
ATTORNEYS

No. 670,861. Patented Mar. 26, 1901.
J. HOPE.
SHIP'S COURSE RECORDER.
(Application filed Apr. 25, 1900.)
(No Model.) 6 Sheets—Sheet 6.

UNITED STATES PATENT OFFICE.

JOHN HOPE, OF LIVERPOOL, ENGLAND, ASSIGNOR OF ONE-HALF TO WILLIAM EDWARD BUCKLEY, OF SAME PLACE.

SHIP'S-COURSE RECORDER.

SPECIFICATION forming part of Letters Patent No. 670,861, dated March 26, 1901.

Application filed April 25, 1900. Serial No. 14,293. (No model.)

*To all whom it may concern:*

Be it known that I, JOHN HOPE, engineer, a subject of the Queen of England, and a resident of Liverpool, in the county of Lancaster, England, have invented certain new and useful Improvements in Ship's-Course Recorders, of which the following is a specification.

This invention has reference to apparatus for continuously recording on a strip of paper or the like the direction and variations of a ship's movements, or, in other words, the direction sailed by a ship, the variation of its compass, and the time of the several records, thus producing a permanent log of the course run by the ship.

The service of a satisfactory and reliable record or log to owners, insurers, or others and to the officers of the ship themselves or one or other of them is well recognized, for it is well known that in collisions the course of a ship at the time of the collision is a difficult fact to ascertain afterward, as evidence on the point is subsequently extremely conflicting. Also through inefficiency and inattention of the steersman time on a passage is frequently lost owing to the fact that deviations from the true course involve a lengthened distance of running and also a retardation of speed. Furthermore, such an instrument is serviceable in case of a ship being wilfully and maliciously put off her course for any wrongful object or aim, acts of this kind (which the parties are most anxious to conceal) being ordinarily also very hard to prove in evidence.

Of the several types of ship's recording apparatus or compasses to which this invention relates it is that in which there is employed a strip of paper or the like, which is suitably moved by a motor—say a spring-motor—past an intermittently-actuated marker, and on which strip the record is marked by the marker, the marker itself having its position controlled, so as always to retain a constant north and south or east and west or other desired position, while the body and general mechanism of the instrument of course moves about the axis of the arbor of the magnets with the ship as it deviates from the course it is sailing in either direction, and in a further respect it also has reference to that type of such apparatus in which a plurality of markers or marking devices are used, the purpose and end of which is to indicate automatically the main direction of the course a ship is traveling—namely, whether it is sailing in a northward or southward or eastward or westward course. Apparatus of this kind— *i. e.*, possessing these characteristics—is well known; and the object of the present invention is mainly to provide improvements in respect of the mode of working these parts or carrying out these actions and to construct and arrange them and other parts accessory to them more simply and inexpensively and at the same time providing an instrument possessing a high degree of accuracy and one which is thoroughly practical.

As already stated, apparatus having mechanisms such as referred to are well known, and examples of them are to be found in the specifications of Letters Patent of the United States to Farciot, No. 413,250, of 1889, and to Peverly, No. 15,017, of 1856, and in the British Letters Patent to Wrigley, No. 13,624 of 1889, to Hope, No. 9,675 of 1891, and No. 9,496, of 1893, and to Berg, No. 13,334 of 1885. Therefore no claim to novelty generally of any of the characteristics comprised in the above patents is made under the invention.

The invention will be described with reference to the accompanying drawings, which illustrate my improvements and show a complete organized ship's-course-recording apparatus or compass in which these improvements are involved.

Figure 3:
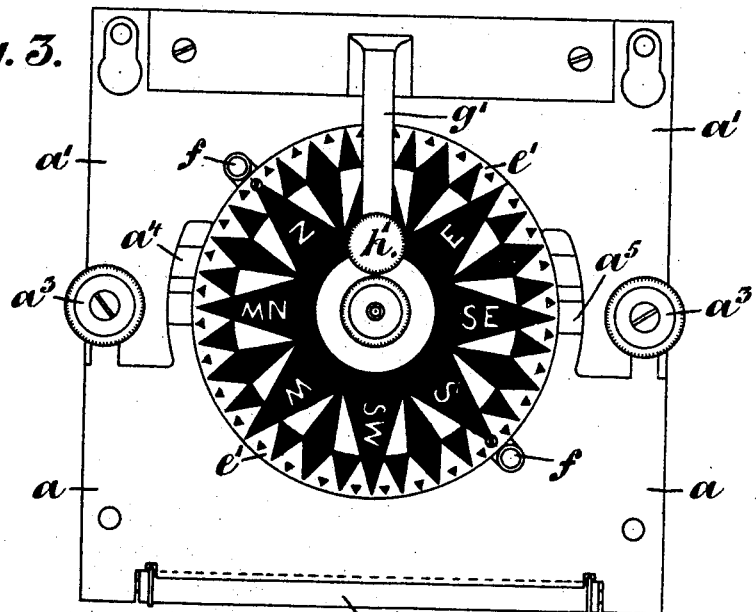
Figure 4:
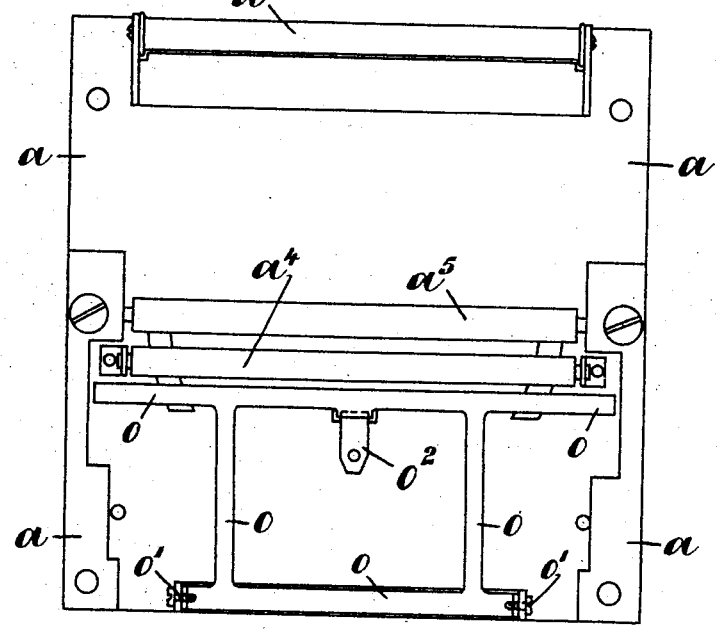
Figure 5:
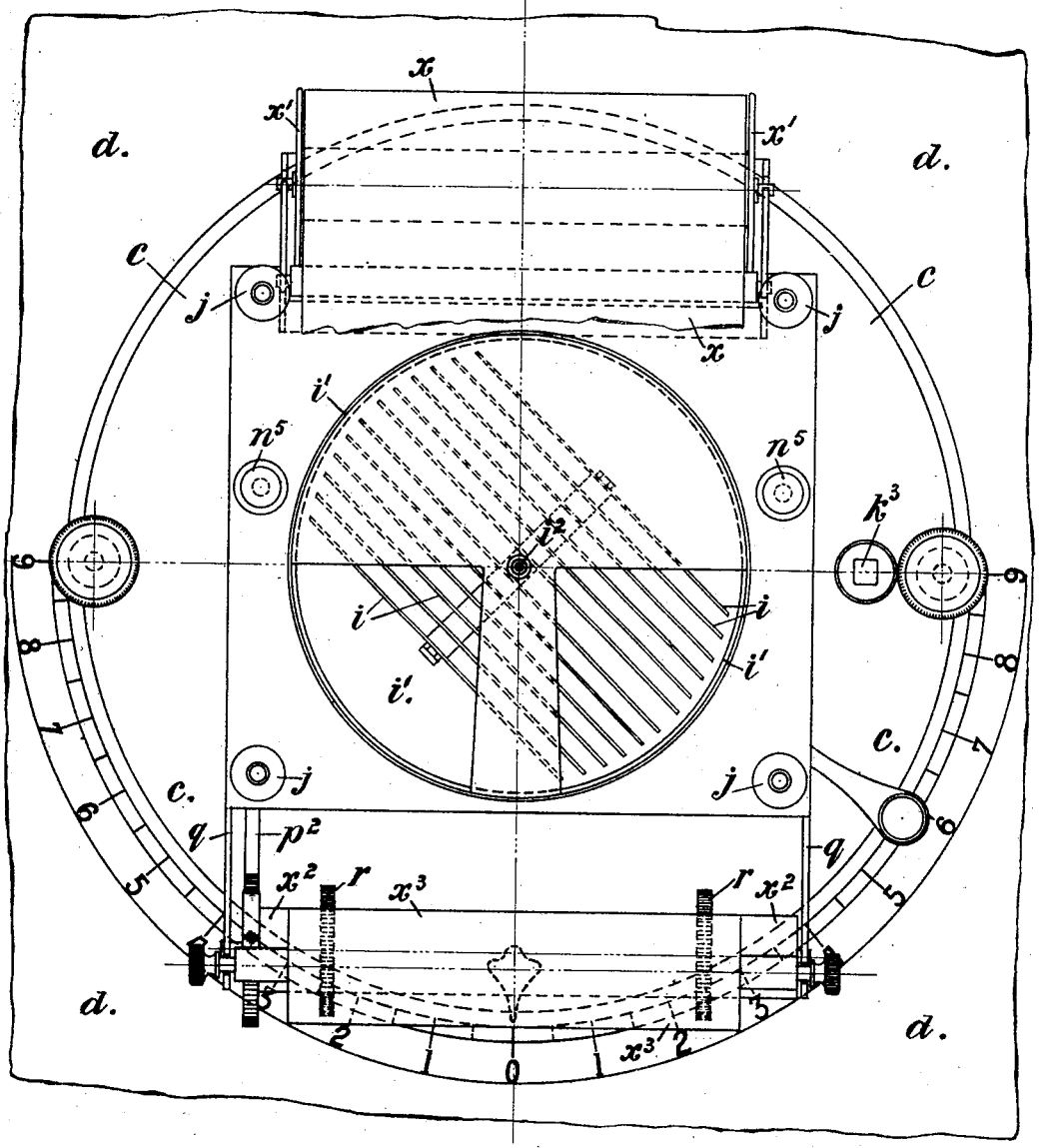
Figure 6:
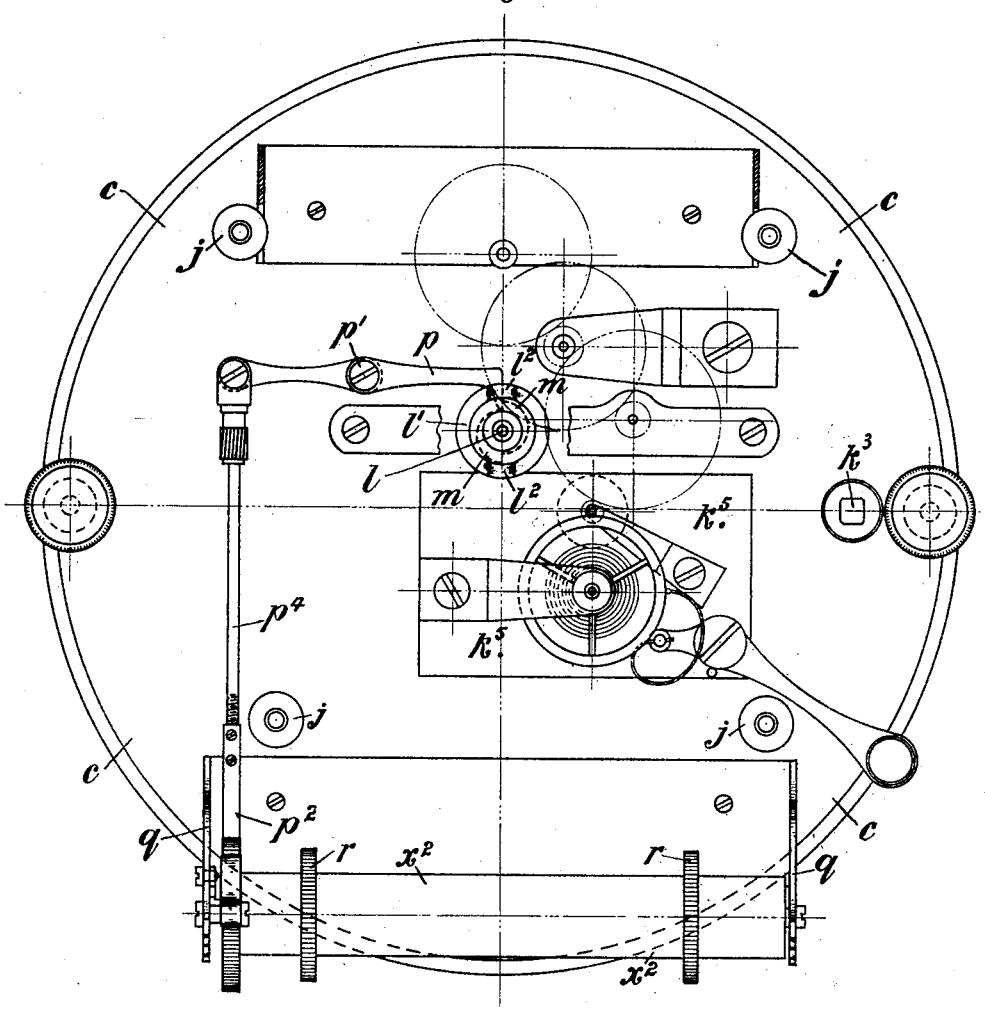
Figure 8:
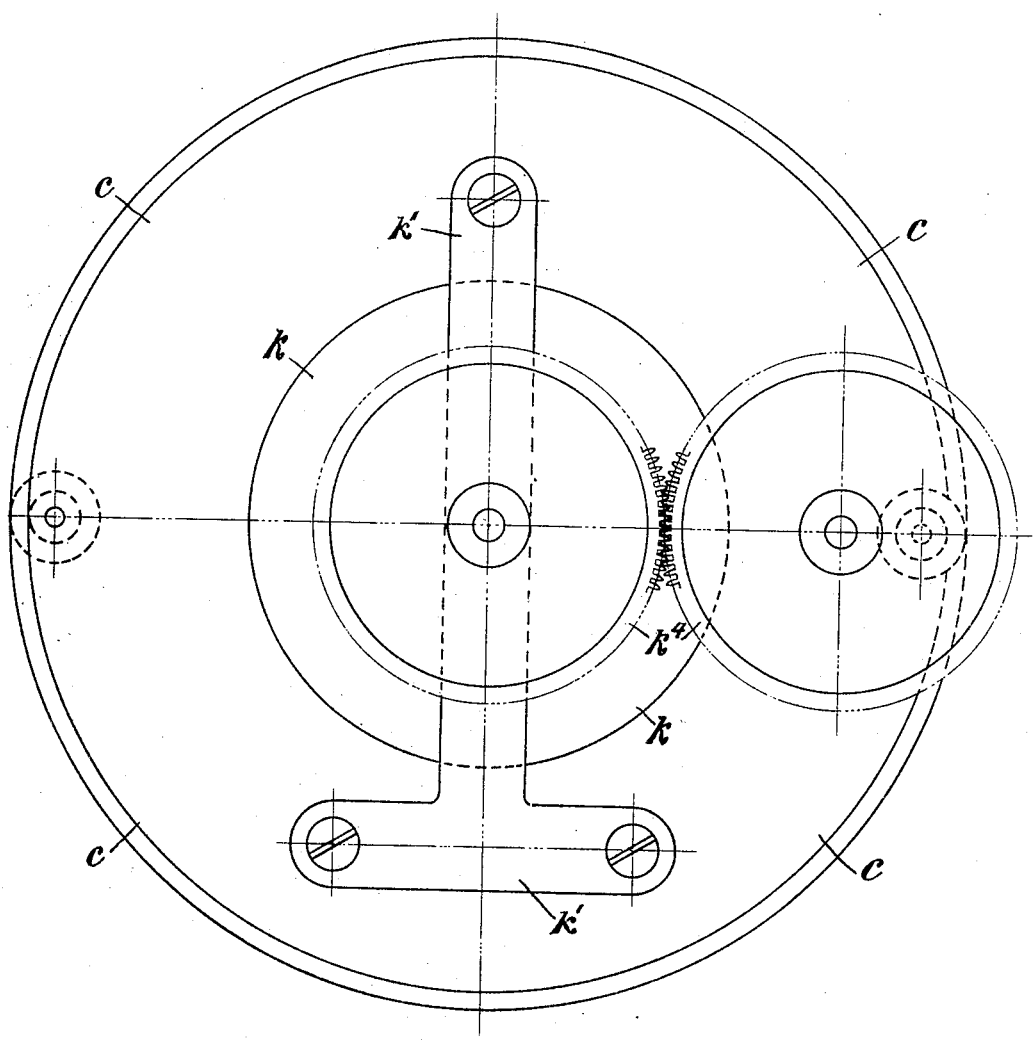

Figure 1 is an outside elevation of the apparatus. Fig. 2 shows the apparatus in longitudinal section. Fig. 3 is a plan showing the card, upper magnet, and upper platform; and Fig. 4 is a plan showing the under side of the platform and parts attached to this side. Fig. 5 is a plan showing the lower controlling-magnets, intermediate table, and the platform which carries the whole instrument, the upper table being removed. Fig. 6 is a similar plan to Fig. 5 with the second platform removed. Fig. 7 is a plan showing the under side of the second or intermediate table and parts attached to it, and Fig. 8 is a plan showing the under side of the instrument timepiece or motor mechanism.

Referring to the drawings, $a$ is the upper table, $b$ is the intermediate or second table, and $c$ is the main platform carrying the whole instrument, while $d$ is a supporting-plate with a hole in it and supporting the platform $c$ at its edge. The plate $d$ would be fixed and supported by or form a part of the compass-box.

$x$ is the strip of paper on which the record is to be taken or marked.

$x'$ is the storage-roller for the blank diagram strip or sheet, and $x^2$ and $x^3$ are the drawing-off or paper-moving barrels and coiling-on barrels, respectively.

$x^4$ is a guiding-roller over which the paper passes on its way to the table $a$.

The table $a$ has a plate $a'$ upon it which projects out in the form of a semicircle $a^2$ in the front. This plate is separable from $a$ and is normally held down by a thumb-screw $a^3$ on either side. The circular projecting portion $a^2$ stands a little distance above the surface of the table $a$, and the paper strip $x$ passes through this space between $a^2$ and $a$, being guided and led up through a slot in the table by rollers $a^4$ and $a^5$, and it passes from the end of the table $a$ to the roller $x^2$ over the roller $a^6$.

Above the table $a$ and the plate $a'$ a magnet $e$ is mounted, and this magnet has attached to it two marking-pens $f$. Above this magnet there is a compass-card $e'$, which, if desired, may carry the pens instead of the magnet. This magnet does not oscillate on itself out of the horizontal plane, but is supported by an arbor $e^2$, the lower end of which fits and works in a socket on a movable support, hereinafter described, while the upper end works in a bush $g$, carried on the end of the bracket $g'$, which is secured on the upper surface of the plate $a'$. The arbor $e^2$ is threaded and passes through a bush $e^3$, carrying the magnet $e$, and has a disk $e^4$ upon it. By holding this disk $e^4$ and revolving the magnet $e$ about its arbor it will be seen that the magnet can be adjusted vertically up and down on the arbor to raise the pens $f$ closer to or farther from the paper.

A spring-arm $h$ is fixed on the under side of the bracket $g'$ and disk $e^4$ and is moved up and down by a thumb-screw $h'$, which works in the arm of the bracket $g'$. By screwing the screw $h$ up through the bracket the spring $h$ lifts the magnet up against the bush $g$ and holds it tight, so that the marking parts cannot move about when the apparatus is being carried by the hand or in transit, &c. By screwing the screw $h$ down through the bracket the disk $e^4$ and magnets and parts connected with it are lowered and the spring-arm is moved out of contact, so freeing the magnet.

The magnet $e$ is not a controlling-magnet for controlling the position of the pens $f$, but is controlled by other and entirely separate magnets $i$, inclosed in the case $i'$ on the second or intermediate table $b$, the arbor or axis $i^2$ of which is coincident with, but entirely separate from, the arbor $e^2$ of the magnet $e$. The magnets $i$ (see Figs. 2 and 5) consist of a plurality of thin steel magnetized bars coupled together in the well-known way, and as they retain their north and south position, as a ship, with the other parts of the apparatus or instrument moves when the ship sails out of a straight line in sailing its course, these magnets control the marker-magnet $e$ and keep it in its north and south position, and as the paper $x$ moves past the marker it is marked by the lowering of the markers $f$, one of which comes onto the surface of the chart, as hereinafter described. Only one of the markers marks at a time—namely, that marker which is standing in the front of the instrument at some point outside the periphery of the circular plate $a^2$—as the paper strip $x$ moves over only that half of the table $a$ which is beneath this plate, and the other or back half of the table $a$ and plate $a^2$ being at a lower level, as shown in Figs. 1 and 2, and below the lower limit of movement of the end of the other marker the back marker does not reach it.

The second table $b$, supporting the magnets $i$, and the table $a$ are carried from the platform $c$ by columns $j$.

The up-and-down movement of the magnet $e$ and markers $f$, as well as the movement of the record-paper strip $x$ across the table $a$, is effected by a time-keeping spring-motor, the spring of which is contained in a case $k$ beneath the platform $c$, being carried on a plate $k'$ by bars $k^2$, fixed on the under side of the platform $c$. This spring is wound by an arbor $k^3$, projecting through the platform $c$ and through gearing-wheels $k^4$. The clock mechanism is of any known suitable kind and drives the driving-arbor $l$ through an escapement mechanism $k^5$ and a train of wheels in any well-known way, and this arbor $l$ carries the parts which give movement to the operating mechanisms of the instrument—namely, the mechanism for raising and lowering the magnet $e$ and rotating the paper-winding-off roller or barrel $x^2$.

The operating device referred to on the arbor $l$ consists of a cam-disk $l'$, having on its upper surface two sunken parts or "dips" $l^2$ and below two cam devices $m$. The upper face of the cam-disk $l'$ operates—that is, lifts and lowers—the magnet $e$ through the following mechanism:

On the under side of the table $b$ there is a frame $n$, fulcrumed at $n'$ and having at its opposite end in the center a small roller $n^2$, which rests on the upper face of the cam-disk $l'$. As the cam-disk $l'$ is rotated by the clock-motor the wheel $n^2$, and with it the frame $n$, is lowered when it (the wheel $n^2$) drops into the dips $l^2$, and it is raised when it runs up out of these dips onto the other part of the roller-path of the disk. This up-and-down motion is transmitted from the frame $n$ to a second frame $o$, fulcrumed at its outer end at $o'$, through bars $n^3$, fixed on the ends of the front part of the frame $n$, said bars being guided in the guides $n^4$. The bars $n^3$ have heads $n^5$, which lie below the ends of the outer transverse bar of the frame $o$, and hence as the bars $n^3$ are raised and lowered the heads $n^5$, acting on the frame $o$, move it up and down about its fulcrum $o'$.

At the center of the bar of the frame $o$, which is acted upon by the heads $n^5$, there is a horn or projection $o^2$, and this projects up, as shown in Fig. 2, through an opening in the table $a$ and carries at its outer end a socket $o^3$, in which the lower end of the arbor $e^2$ of the magnet $e$ rests. Thus by the movement of the frame $o$, as described, this socket $o^3$ is moved up and down, and so moves the arbor $e^2$, and with it the magnet $e$, up and down, the upper end of the arbor $e^2$ merely sliding up and down loosely through its upper bush-bearing $g$.

The paper-moving roller $x^2$ is actuated—that is, rotated—by the cams $m$ as follows: As these cams are revolved by the arbor $l$ they act on one end of a lever $p$, fulcrumed at $p'$, and move this end outward, and then when the tip of each cam passes from under the end of the lever $p$ this lever is moved rapidly inward toward the arbor $l$ by a suitable spring. The cams $m$ being of the form shown in Fig. 6, they first move the lever $p$ gradually in one direction. Then when their tips pass from under the lever end this lever suddenly moves back to the position for reactuation. This lever $p$ transmits its motion to a spring-pawl $p^2$, carried on the adjustable head $p^3$ of connecting-bar $p^4$, attached to one end of the lever $p$, the head $p^3$ being supported from one of the roller-supporting brackets $q$ by a link $p^5$. The outer end of this rod $p^4$ is threaded, so that the length between the tip of the pawl $p^2$ and the lever $p$ may be adjusted to give the requisite throw and movement of the roller $x^2$. The action of the roller $x^2$ is therefore intermittent and its return is gradual, while the return of its actuating-pawl to give it a fresh actuation is rapid. The paper strip $x$ passes under the taking-off roller $x^2$ and is secured in the gap $x^5$ of the winding-up roller $x^3$. The rotation of this roller $x^3$ is effected by the two wheels $r$ on the roller $x^2$, on the periphery of which the roller $x^3$ rests. The peripheries of these wheels $r$ are made in the form of sharp teeth, and the friction of these teeth on the surface of the paper around the roller $x^3$ causes this roller to be rotated as the roller $x^2$ is rotated, and as the peripheral speed of the paper coiled upon $x^3$ will be always the same as the peripheral speed of the rollers $r$ the rate at which the paper is coiled upon $x^3$ will be constant and uniform with the rate at which it is drawn over the platform $a$ by the roller $x^2$.

In order to enable the vertical plane in which the magnets stand to be parallel with or approach the vertical plane of the mechanism carried on the platform $c$, so that the marker in action shall mark on or near the center part of the chart and render the markings more open and legible, the platform $c$ is adapted to be moved or adjusted circularly in the plate $d$ and set at any degree which may be desired, the degrees being marked on the plate $d$, as shown in Fig. 5.

What is claimed in respect of the herein-described invention is—

1. In a ship's-course-recording apparatus, the combination of markers, controlling-magnets $i$, freely suspended to constantly lie in the magnetic meridian under the varying position of the ship and a magnet $e$ for controlling the position of the markers, separate from and controlled by said magnets $i$; substantially as set forth.

2. In a ship's-course-recording apparatus, the combination of a diagram sheet or chart, controlling-magnets $i$, freely suspended to constantly lie in the magnetic meridian under the varying position of the ship and marker-controlling magnets $e$, separate from and controlled by said magnets $i$, and adapted to be moved toward and away from said diagram sheet or chart; substantially as set forth.

3. In a ship's-course-recording apparatus, the combination of markers, controlling-magnets $i$, freely suspended to constantly lie in the magnetic meridian under the varying position of the ship and a magnet $e$ for controlling the position of the markers, separate from and controlled by said magnets $i$, the axes of said magnets $i$ and magnet $e$ being coincident; substantially as set forth.

4. In a ship's-course-recording apparatus, controlling-magnets $i$, an axis $i^2$ therefor said magnets being adapted to revolve or move about said axis $i^2$, to constantly lie in the magnetic meridian under the varying positions of the ship but immovable out of the line in which its axis lies; and a marker-controlling magnet $e$, having its axis coincident with that of the magnets $i$, and immovable out of the vertical line passing through the said axis; substantially as set forth.

5. The combination of the cams $l'$ and $m$ directly above one another, a main driven arbor $l$; a hinged frame $n$, a roller $n^2$ carried thereby said roller resting on the face of cam $l'$; a taking-off roller and a lever $p$ with a hinge $p'$ for operating the taking-off roller, having one end engaged with and operated by the cam $m$; substantially as set forth.

6. The combination of the horizontal cam $l'$ on the driving-arbor $l$; the horizontal frame $n$ with roller $n^2$ working on the face of the cam $l'$; a bar $n^3$ on either side of the frame $n$; guides $n^4$ for guiding the bars $n^3$; and heads $n^5$ on the upper ends of the bars $n^3$; substantially as described.

7. The combination with the upper marking-table $a$ of the hinged frame $o$, having an upwardly-projecting central part $o^2$ carrying on its end the socket $o^8$; substantially as set forth.

8. The combination with the marking-table $a$, marking-magnets, arbor therefor and upper support for said magnet of a detachable plate $a'$, having a bracket $g'$ supporting the upper support of the marking-magnet arbor; substantially as set forth.

9. The combination of the magnet $e$; arbor $e^2$, lower movable socket-support $o^3$ for the arbor, and upper bush-support $g$, in which said arbor can rise and fall vertically; substantially as set forth.

10. The combination with the marker-magnet $e$, threaded arbor $e^2$, and boss $e^3$ carrying the magnet $e$, and adapted to screw up and down on the arbor; substantially as set forth.

11. The combination of chart-storing roller $x'$, table $a$, guide-roller $a^4$ for guiding the chart beneath one part of the table, and guide-roller $a^5$ having its upper periphery level with the surface of the table for guiding said paper onto the remaining portion of the surface of the table; substantially as set forth.

12. In a ship's-course recorder, the combination with a marking device, a marker-magnet, a controlling-magnet a diagram sheet or chart, an arbor having said marking device adjustable thereon, a seat for the lower end of said arbor, and a tilting support for said seat with means for operating the same to lift the markers, substantially as described.

In witness whereof I have hereunto set my hand in presence of two witnesses.

JOHN HOPE.

Witnesses:
JOHN HINDLEY WALKER,
FRANK. E. FLEETWOOD.